United States Patent [19]

Leigh-Monstevens et al.

[11] Patent Number: 4,878,041

[45] Date of Patent: Oct. 31, 1989

[54] HYDRAULIC MASTER CYLINDER SWITCH

[75] Inventors: Keith V. Leigh-Monstevens, Troy; Richard A. Nix, Utica, both of Mich.

[73] Assignee: Automotive Products plc, Warwickshire, England

[21] Appl. No.: 279,332

[22] Filed: Dec. 2, 1988

Related U.S. Application Data

[63] Continuation of Ser. No. 80,196, Jul. 29, 1987, abandoned, which is a continuation of Ser. No. 590,168, Mar. 16, 1984, abandoned.

[51] Int. Cl.⁴ .......... B60Q 1/26

[52] U.S. Cl. .......... 340/479; 200/61.89; 340/453

[58] Field of Search .......... 180/174, 179, 178; 340/52 R, 52 F, 53, 71; 200/61.89, 61.9, 61.91, 61.76, 61.58 R; 60/584; 141/1; 192/85 CA

[56] References Cited

U.S. PATENT DOCUMENTS

| | | | |
|---|---|---|---|
| 2,244,834 | 6/1941 | Freeman | 200/61.89 |
| 2,276,028 | 3/1942 | Dick | 200/61.89 |
| 2,716,678 | 8/1955 | Randol | 200/61.89 |
| 3,257,522 | 6/1966 | Raab | 200/61.89 |
| 3,273,552 | 9/1966 | Plath | 200/61.89 |
| 3,411,133 | 11/1968 | Gardner | 200/61.89 X |
| 3,461,425 | 8/1969 | Schultz et al. | 200/61.89 X |
| 3,487,183 | 12/1969 | Schulman | 200/61.89 |
| 3,702,458 | 11/1972 | Capachietti, Sr. et al. | 200/61.89 X |
| 3,794,147 | 2/1974 | Shellhause | 200/61.89 X |
| 4,393,285 | 7/1983 | Hiraiwa et al. | 200/61.91 X |
| 4,569,239 | 2/1986 | Shirley et al. | 180/179 X |

*Primary Examiner*—Ulysses Weldon
*Attorney, Agent, or Firm*—Krass & Young

[57] ABSTRACT

An electrical switch operated by the input member of a hydraulic master cylinder and controlling the stop signal lights of a motor vehicle, when associated with the master cylinder of a hydraulic brake system, and/or controlling a cruise control disconnect circuit. When associated with the master cylinder of a clutch hydraulic control system, the switch is adapted to close an interlock circuit allowing the motor vehicle driver to start the engine only when the clutch is fully released, and to operate a cruise control disconnect circuit upon small displacement of the input member from its home position.

19 Claims, 2 Drawing Sheets

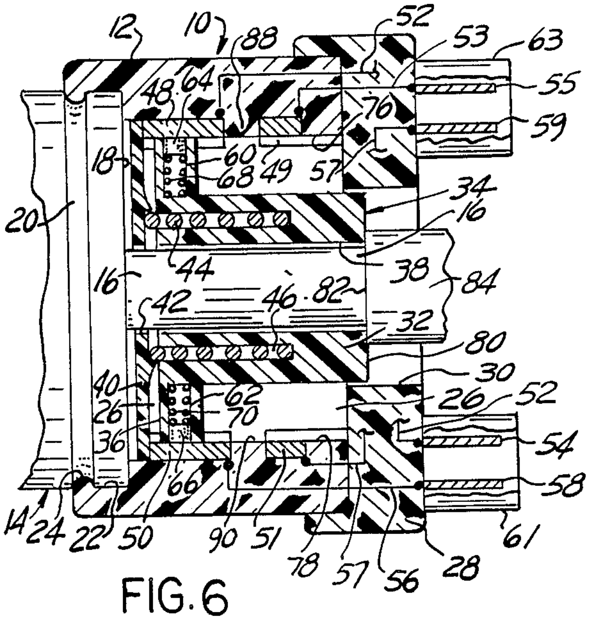
FIG. 6
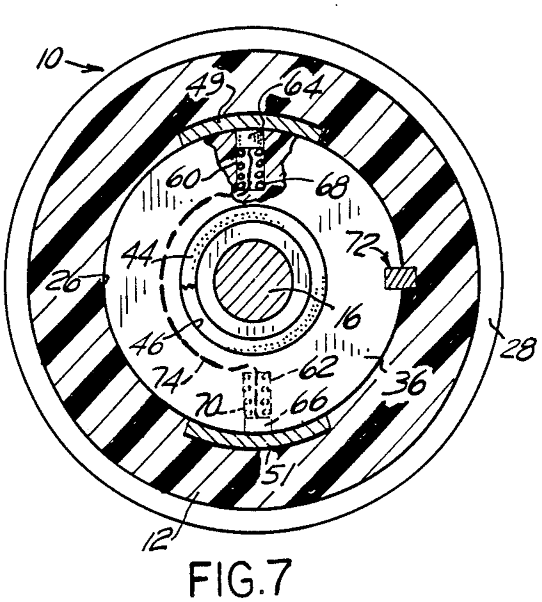
FIG. 7
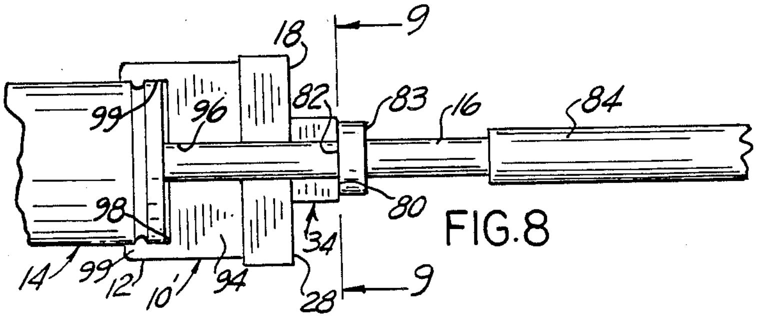
FIG. 8
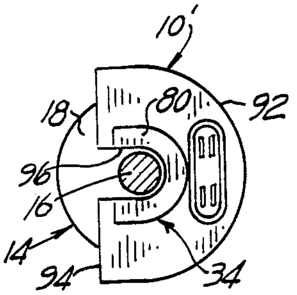
FIG. 9
FIG. 10
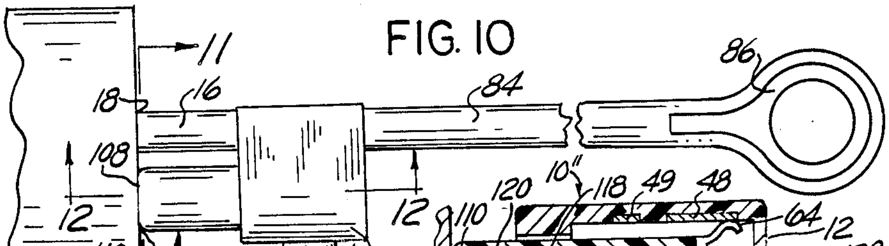
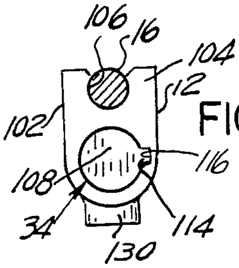
FIG. 11
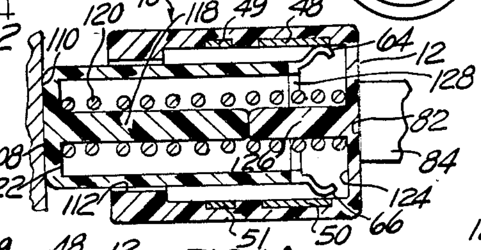
FIG. 14
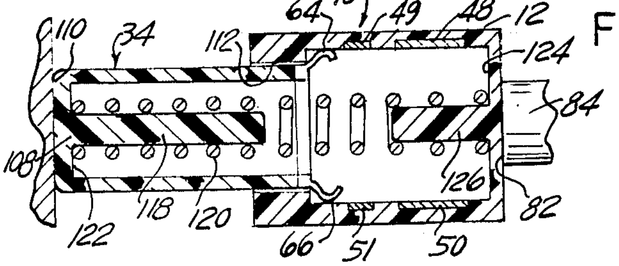
FIG. 12
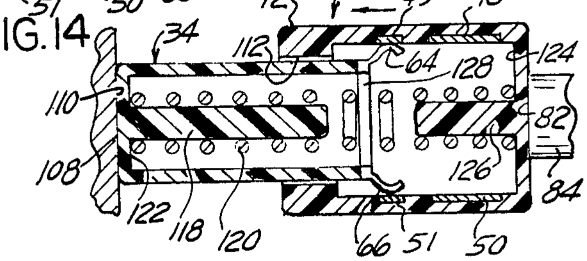
FIG. 13

HYDRAULIC MASTER CYLINDER SWITCH

This a continuation of co-pending application Ser. No. 080,196 filed on July 29, 1987 now abandoned, which is a continuation of application Ser. No. 590,168 filed on Mar. 16, 1984, now abandoned.

BACKGROUND OF THE INVENTION

The present invention relates to an electrical switch operated by the input member of a hydraulic master cylinder, such as the master cylinder of a motor vehicle clutch hydraulic control system, the master cylinder of a motor vehicle hydraulic brake system, and the like.

An electrical switch is often associated with the master cylinder of motor vehicle hydraulic brake systems for the purpose of, for example, energizing the electrical circuit turning on the motor vehicle stop signal lights, or/and for operating a cruise control system from an active mode to an inactive mode upon application of the brakes by the driver. Such electrical switches are generally of the pressure operated type. They are operated by the increase of hydraulic fluid pressure when the brake pedal is displaced such as to cause a corresponding displacement of the master cylinder piston, thus increasing the pressure of the hydraulic fluid in the master cylinder in front of the piston. Pressure operated switches are costly to manufacture and they must be installed, at least partly, within the master cylinder. They are often unreliable as they must be activated by a slight increase in the hydraulic fluid pressure for providing an appropriate stop signal even upon slight application of the brakes or for disconnecting the cruise control system as a result of a slight foot tap on the brake pedal.

The functioning of pressure actuated switches may be somewhat erratic under certain conditions, hydraulic fluid back pressure surges in the master cylinder caused, for example, by heat expansion of the brake linings and of the hydraulic fluid. Such erratic functioning of pressure-actuated switches causes erratic turning on and off of the motor vehicle stop signal lights, particularly irritating to the driver of a motor vehicle immediately following.

Hydraulic control apparatus for motor vehicle mechanical clutches are rapidly becoming the standard of the industry for operating the clutch release mechanism of a motor vehicle provided with a mechanical clutch and a conventional manually shiftable transmission or gearbox. Examples of such hydraulic control systems for mechanical clutches are disclosed in U.S. Pat. No. 4,407,125, and in co-pending applications Ser. Nos. 371,958, now abandoned; 376,248, now U.S. Pat. No. 4,599,860; 477,161, now U.S. Pat. No. 4,585,108 ; 477,162, now U.S. Pat. No. 4,585,109; 477,159, now U.S. Pat. No. 4,585,106; 477,160, now U.S. Pat. No. 4,585,107; 537,869, now U.S. Pat. No. 4,684,003; 555,667, now U.S. Pat. No. 4,624,290; 555,666, now U.S. Pat. No. 4,785,615; 555,668, now abandoned all assigned to the same assignee as the present application. It has become general practice in the automobile industry to interlock the operation of the engine starter motor with other controls of the motor vehicle such that the starter motor is rendered inoperative unless the transmission is in neutral or park in motor vehicles provided with an automatic transmission or, in motor vehicles provided with a foot operated clutch and a manually operated gearshift transmission, unless the transmission is in neutral and/or the clutch pedal is fully depressed to fully release the clutch. In addition, it is convenient, in motor vehicles provided with a cruise control and a mechanical clutch, to shut off the operation of the cruise control upon, for example, down shifting which in turn requires release of the clutch. However, it is desirable that the cruise control be disconnected even before the clutch is fully released, to enable the driver to cut off the cruise control by a slight foot tap on the clutch pedal, and perhaps to discourage "riding" the clutch, i.e. resting one's foot on the clutch pedal at all times.

SUMMARY OF THE INVENTION

The present invention is a mechanically actuated limit switch, exteriorly mounted on the end of the master cylinder or on the input member of a hydraulic control apparatus, such as a clutch hydraulic control or a hydraulic brake control, which is directly operated by the master cylinder input member.

These and other objects of the present invention will become apparent to those skilled in the art when the following description of the best mode contemplated at the present for practicing the invention is read in conjunction with the accompanying drawing wherein like numerals refer to like or equivalent parts, and in which:

Figure 1:
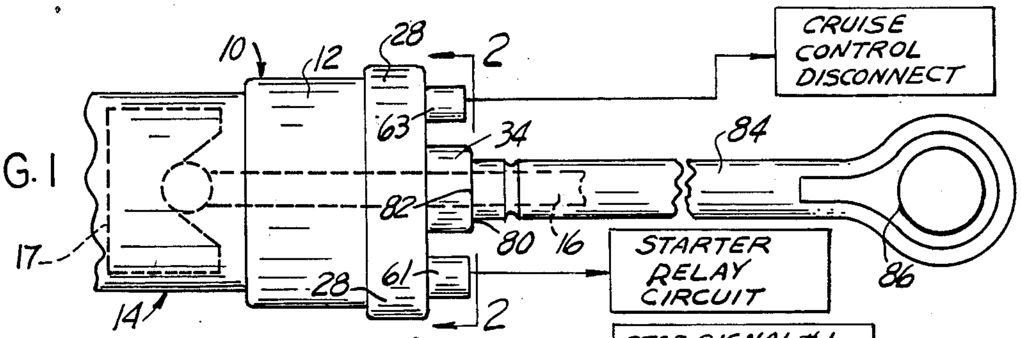
FIG. 1 is a partial elevational view of a hydraulic master cylinder and input member assembly for a clutch hydraulic control, provided with an electrical switch, according to the present invention.
Figure 3:
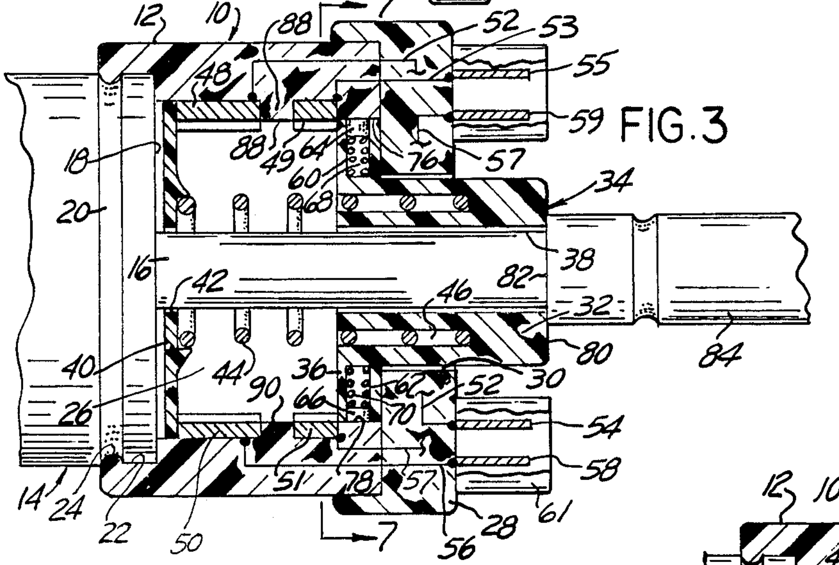
Figure 2:
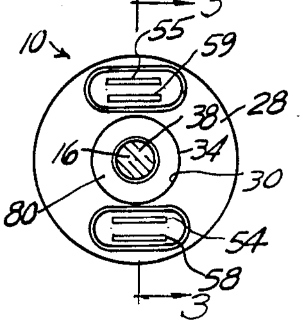
Figure 4:
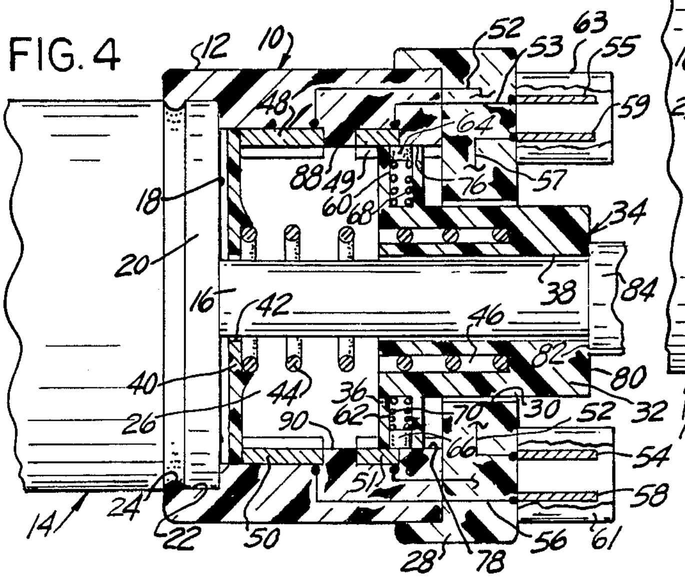
Figure 5:
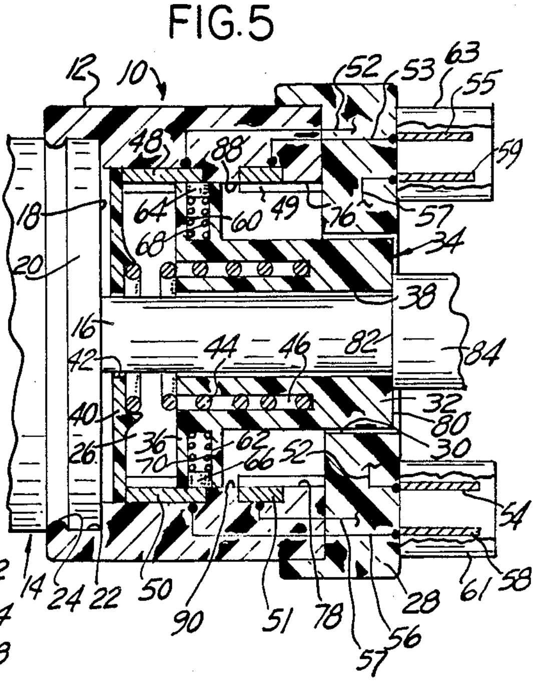

FIG. **1*a* is a view similar to FIG. 1**, but showing a master cylinder and input member assembly for a hydraulic brake system;

FIG. 2 is an end view from line 2—2 of FIG. 1;

FIG. 3 is a longitudinal sectional view thereof from line 3—3 of FIG. 2;

FIGS. 4 through 6 are views similar to FIG. 3, but illustrating progression in the operation of the invention;

FIG. 7 is a cross-sectional view along line 7—7 of FIG. 3;

FIGS. 8 and 9 are views to FIGS. 1 and 2 respectively, but illustrating a modification of the invention;

FIG. 10 is a view similar to FIG. 1, but showing a further modification of the invention;

FIG. 11 is an end view along line 11—11 of FIG. 10;

FIG. 12 is a longitudinal section thereof along line 12—12 of FIG. 10; and FIGS. 13 and 14 are views similar to FIG. 12, but showing the operation of the illustrated embodiment of the invention.

DETAILED DESCRIPTION OF THE PREFERRED EMBODIMENTS

Referring to the drawing, and more particularly to FIGS. 1-2 thereof, the present invention takes the form of an electric switch 10 enclosed in a dielectric plastic housing 12 mounted on the end of a hydraulic master cylinder 14. The hydraulic master cylinder 14 may, for example, be the master cylinder of a motor vehicle clutch hydraulic control system, FIG. 1, as described in detail in the aforesaid U.S. patent and copending applications, or the master cylinder of a motor vehicle hydraulic brake system, FIG. **1*a***.

As is well known in the art, a linear input member in the form of a pushrod 16 is disposed reciprocable through an end 18, FIGS. 3–6, of the hydraulic master cylinder 14 which is closed by an end cap, not shown, provided with an appropriate central aperture accepting the pushrod 16 therethrough. An end of the pushrod 16 is coupled to a piston 17 slidably disposed within the master cylinder 14, and displacement of the piston causes in turn a portion of the hydraulic fluid in front of the piston in the master cylinder 14 to be displaced through a tubular conduit, not shown, to slave cylinder, such as the wheel brake slave cylinders of a hydraulic brake system or the slave cylinder actuating a mechanical clutch release mechanism. The end 18 of the master cylinder 14 through which reciprocates the pushrod 16 is generally, in conventional structures, protected by an elastomeric boot. In the present structure, the elastomeric boot is replaced by the switch housing 12 which may be attached to the hydraulic master cylinder 14 proximate its end 18 by any convenient means such as being screwed on, cemented on, or the like. In the structure illustrated, the peripheral surface of the master cylinder 14 is provided proximate its end 18 with a peripheral annular groove 20, and the switch housing 12 has a cylindrical recess 22 at an end with an annular ridge 24 projecting from the internal surface of the recess 22 elastically engaging the groove 20 for snap fit of the switch housing 12 over the peripheral surface of the master cylinder 14 proximate its end 18.

The switch housing 12 has a cylindrical bore 26 closed at one end by an end cap 28 having a central aperture 30 in which is slidably disposed the body 32 of a plunger 34. The plunger 34, also made of a dielectric plastic material, is provided with an integral radially disposed flange portion 36. The plunger 34 has a central bore 38 loosely accepting therethrough the pushrod 16. The other end of the switch housing 12 is closed by an end wall 40, cemented or heat-welded thereto, having a central aperture 42 affording free passage therethrough to the pushrod 16. A return coil spring 44 is disposed surrounding the pushrod 16. One end of the coil spring 44 engages the end wall 40 and the other end engages the bottom of an annular recess 46 disposed in the plunger 32. The annular recess 46 acts as a pilot means for the coil spring 44 and as a recess in which the coil spring, when compressed, retracts, FIGS. 4–6, such as not to cause any interference with full displacement of the plunger 34, and thus enables the switch 10 to be of a relatively short length.

Two pairs of separate longitudinal disposed stationary contacts 48–50 and 49–51 are affixed in recesses in portions of the internal surface of the bore 26 of the switch housing 12. The stationary contacts 48 and 50 are disposed about 180° from each other, and the contacts 49 and 50 are similarly disposed. The stationary contacts 48 is connected through a wire 52 to a terminal 54, and the stationary contact 50 is connected through a wire 56 to a terminal 58, the terminals 54 and 58 being in a connector 61 mounted, for example and as illustrated, on the end of the switch housing end cap 28. The stationary contact 49 is connected through a wire 53 to a terminal 55, and the contact 51 is connected through a wire 57 to a terminal 59, the terminals 55 and 59 being in a connector 63 also mounted, in the example of structure illustrated, on the end of the switch housing end cap 28.

The plunger end flange 36 has a pair of diametrally aligned radial bores 60 and 62, FIGS. 3–6. A sliding brush contact 64 is slidably disposed in the radial bore 60 and a sliding brush contact 66 is similarly disposed in the radial bore 62, the brush contacts 64 and 66 being respectively urged outwardly by coil springs 68, 70, respectively. Means are provided, such as for example a key and key slot arrangement, as shown at 72 at FIG. 7, for preventing the plunger flange 36 from rotating relative to the switch housing 12, the key and key slot arrangement 72 permitting only relative longitudinal motions therebetween. The two sliding contacts 64 and 66 are interconnected by a wire, shown schematically at 74 at FIG. 7, such that when the sliding contacts 62 and 64 short circuit the stationary contact pair 49–51, FIG. 4, or the stationary contact pair 48–50, FIGS. 5 and 6, according to the linear position occupied by the plunger flange 36, any electrical circuit connected across the terminals 55–59, or any electrical circuit across the terminals 54–58, is individually closed. In the position illustrated at FIG. 3, or home position, both circuits are open as a result of the sliding contacts 64 and 66 engaging portions 76 and 78 of the surface of the housing bore 26 proper beyond the leading end of the stationary contacts 49 and 51.

The switch plunger 34 has an annular end face 80 engageable by an annular abutment 82 provided on the pushrod 16. The annular abutment 82 may be on the end face of a collar 83 clamped around the pushrod 16, FIG. 8, or, in the example of structure illustrated at FIGS. 1–7, it is formed at the end of an extension rod 84 having at its other end an eye 86, FIGS. 1 and 1*a*, for swivelling connection to a brake control pedal or to a clutch control pedal, not shown, the extension rod 84 being connected to the pushrod 16 by any convenient means, such as press-fit thereon of the tubular end of the extension rod 84 or threaded fit, brazing or swaging.

The annular abutment 82 may also take the form of the end of a spacer disposed between the end of the extension rod 84 and the plunger annular end face 80, or the form of a spring clip snapped around the rod 16 at an appropriate position in engagement with the plunger annular end face 80 or in proximity therewith.

In hydraulic control systems for mechanical clutches utilizing the present invention, and where it is desired to disconnect a cruise control mechanism upon shifting gears, or pressing slightly or tapping the clutch pedal, the terminals 55–59 in the connector 63 are connected to the cruise control disconnect circuit, as schematically represented at FIG. 1, and as soon as the plunger 34 is displaced by the annular abutment 82 of the pushrod 16 from the position shown at FIG. 3 of the drawing to the position causing engagement of the sliding brush contacts 64 and 66 with the stationary contacts 49 and 51, FIG. 4, the cruise control disconnect circuit is closed and the cruise control is turned off. Further depressing the clutch pedal causes the annular abutment 82 to further displace the switch plunger 34 to a position, FIG. 5, wherein the circuit across the terminals 54–58 is closed. As the terminals 54–58, in the connector 61, are connected across the engine starter motor relay circuit, the starter motor relay circuit is enabled, thus allowing the motor vehicle operator to start the vehicle engine. The position of the plunger 34 causing engagement of the sliding brush contacts 64 and 66 with the stationary contacts 48 and 50 connected across the terminals 54–58 corresponds to a position of the clutch pedal fully releasing the clutch. However, the stationary contacts 48 and 50 are provided with a relatively considerable length, as compared to the length of the contacts 49 and 51, such as to correspond to a full stroke of the clutch pedal, and consequently a full stroke of the master cylinder pushrod 16, from the beginning of the clutch release until the clutch pedal hits the floorboard, such positions being shown approximately at FIGS. 5 and 6 respectively.

In installation where there is no cruise control on the motor vehicle, the structure of the switch 10 may remain the same, the terminals 54–58 remaining unconnected but available if a cruise control is subsequently installed on the motor vehicle.

Figure 1A:
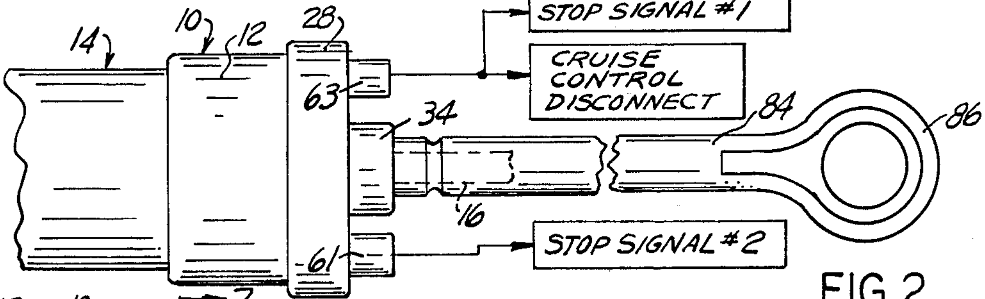

In installations wherein the switch 10 is mounted on the end of the master cylinder 14 of a hydraulic brake system, FIG. 1*a*, the terminals 54–58 in the connector 63 are connected in series in the motor vehicle stop signal light circuit, and the contacts 49 and 51 are made such as to extend longitudinally on the surface of the bore 26 of the switch housing 12, such that the stop signal lights remain on irrespective of the position of the brake control pedal. However, by keeping two separate pairs of contacts 49–51 and 48–50 as shown, the switch 10 becomes of universal use, thus decreasing the inventory of parts, and both pairs of terminals 55–59 in the connector 63 and 54–58 in the connector 61 may be connected in parallel with each other and their common junction point connected in series in the stop signal light circuit, with the result that the stop signal lights remain on as long as the brake pedal is depressed, on the condition that the insulting portions 88 and 90 of the surface of the bore 26 between, respectively, the stationary contacts 48 and 49 and the stationary contacts 50 and 51 be narrower than the width of the sliding brush contacts 64 and 66, such that the brush contacts 64 and 66 remain simultaneously engaged respectively with the contacts 48 and 49 on one hand and 50 and 51 on the other hand while passing over the insulating portions 88 and 90 of the switch housing bore 26. The structure of the switch 10, with two separate pairs of stationary contacts, also permits to provide a motor vehicle brake application progressive warning system, for example by connecting the terminals 5–59 in the connector 63 in series in the stop light circuit of a different color, such as amber or yellow (stop signal No. 1), and connecting the terminals 54–58 in the connector 61 in a circuit for red stop signal lights (stop signal No. 2). The terminals 55–59 in the connector 63 are also available for connection to a cruise control disconnect circuit, FIG. 1*a*, for enabling the motor vehicle driver to cut off the operation of the cruise control upon application of the brakes or as a result of a slight tap upon the brake pedal.

Instead of taking the cylindrical form illustrated at FIGS. 1–7, the switch housing 12 may take any convenient form such as, for example, the switch 10′ illustrated at FIGS. 8 and 9 having a housing 12 provided with a generally cylindrical peripheral surface portion 92, FIG. 9, and a generally flat side surface portion 94, FIG. 8. The housing 12 of switch 10′ encloses a switch assembly identical to that of FIGS. 3–7, except that the bore 26 and the plunger and flange 36 extend circumferentially over less than 360°. The housing 12 of the switch 10′ is elastically snapped sideways over the master cylinder 14 proximate the end 18 thereof. The housing 12 of the switch 10′ has a longitudinal slit 96 permitting sideways passage over the master cylinder pushrod 16, and the plunger switch 34 is substantially U-shaped such as to be disposed around approximately one-half of the periphery of the pushrod 16. The housing 12 of the switch 10′ has a generally U-shaped end recess 98 with wings 99 that elastically spread for pushing over a portion of the peripheral surface of the cylinder 14 proximate its end 18, and spring back elastically for snap fit of the housing 12 over the end of the master cylinder 14.

It will be readily apparent to those skilled in the art that the invention encompasses other structures than those specifically illustrated at FIGS. 3–7 and described hereinbefore. Also, it will be readily apparent that instead of being mounted on the end of the master cylinder 14, the electrical switch may be installed on the pushrod 16, itself, as illustrated at FIGS. 10–14.

The electrical switch 10″ of FIGS. 10–14 comprises a housing 12, made of plastic, having a bifurcated portion forming a pair of wings 102 and 104, as shown more particularly at FIG. 11, defining therebetween a partially cylindrical recess with a cylindrical surface 106 extending over an arc of slightly more than 180°, such as to enable the housing 12 to be attached to the pushrod 16 by resilient spreading apart of the wings 102 and 104, while pushing the housing 12 sideways upon the pushrod 16, with an end of the housing 12 abutting against the annular abutment 82 formed, for example, on the end of the pushrod extension 84. A plunger 34 projects from the other end of the housing 12, and the end face 108 of the plunger 34 normally abuts a closure plate 110 at the end 18 of the master cylinder 14 through which reciprocates the pushrod 16. For the purpose of clarity of the disclosure of the invention, the outer face of the end plate 110 of the master cylinder 14 is shown as being flush with the end 18 of the housing of the master cylinder 14 while, in most structure, the closure plate may be slightly recessed from the cylinder end. The plunger 34 reciprocates through an end bore 112 in the housing 12. A key 114, FIG. 11, formed longitudinally integral with the body of the plunger 34 engages a corresponding longitudinal groove 116 in the housing 12 for preventing the plunger 34 from rotating about its axis during reciprocation thereof.

The plunger 34 is tubular and is provided with an axially disposed pilot pin 118, a coil spring 120 being disposed around the pilot pin 118. One end of the coil spring 120 engages the bottom wall 122 of the tubular plunger 34, while the other end of the coil spring 120 engages the end wall 124 of the housing 18, a short integral pilot pin 126 projecting from the housing end wall 124 being disposed coaxially within the coil spring 120.

The end of the tubular plunger 34 is provided with a metallic ring 128 affixed thereon. The annular ring 128 supports, or is made integral with, a pair of spring sliding contacts 64 and 66, whose function is the same as the brush contacts 64 and 66 of the embodiment of FIGS. 1–7. The bore 26 of the housing 12 is provided with two separate pairs of stationary contact plates 49–51 and 48–50, and functions are the same as the two pair of contacts 49–51, and 48–50 of the embodiment of FIGS. 3–7. The contacts 49 and 51, and 48 and 50 are connected through appropriate electrical conductors, not shown, embedded in the housing 12 to a four-pin or four-socket plug 130, FIGS. 10 and 11, for connection of the switch 10″ to appropriate control circuits as hereinbefore explained in detail with regard to the embodiment of FIGS. 1–7.

FIGS. 12 illustrates schematically the home position of the plunger 34, and consequently of the interconnected sliding contacts 64 and 66, relative to the stationary contacts 49–51 and 48–50, when the master cylinder pushrod 16 is fully extended and the switch 10″ is open, FIG. 12. As soon as the pushrod 16 begins to be displaced, under the action of a clutch pedal or a brake pedal, the plunger 38 engaged at its end against the closure plate 110 of the master cylinder 14 is caused to be retracted against the pressure of the spring 120 within the bore 26 in the housing 12, thus causing the sliding contact 4 and 66, interconnected through the metallic annular ring 128, to close the circuit connected across the stationary contacts 49 and 51, FIG. 13. Further displacement of the plunger 34 within the bore 26 of the housing 12 results in the sliding contacts 64 and 66 becoming engaged with the stationary contacts 48 and 50. The circuit across the stationary contacts 48 and 50 remains closed to the end of the permissible amount of retraction of the plunger 34, as illustrated at FIG. 14, causing end engagement of the pins 118 and 126.

Having thus described the present invention by way of examples of structure well designed to accomplish the objects of the invention, modification whereof will be apparent to those skilled in the art, what is claimed as new is as follows:

We claim:

1. A hydraulic master cylinder assembly for a control system of a motor vehicle, said assembly comprising:

(A) a master cylinder filled with hydraulic fluid;

(B) a piston mounted within said master cylinder;

(C) a rigid input rod including a first end portion projecting into one end of said master cylinder for connection to said piston, a second end portion including means for connection to a control device for the motor vehicle control system, and an elongated central portion rigidly secured to said first and second end portions and extending outside of said master cylinder between said end portions, said input rod being moved axially in response to operator actuation of the control device to move said piston axially in said cylinder and eject hydraulic fluid under pressure form said cylinder;

(D) a hollow switch housing mounted proximate said central input rod portion and extending axially along said rod portion from a first housing end proximate said one end of said master cylinder to a second housing end remote from said one end of said master cylinder;

(E) a plunger mounted within the hollow of said housing and movable reciprocally within said housing hollow between a location proximate said first end of said housing to a location proximate said second end of said sousing;

(F) a spring within said housing hollow urging said plunger toward one of said first and second ends of said housing;

(G) a series of axially spaced electrical contacts mounted in axially spaced location along an internal surface of the hollow of said housing in juxtaposition to the reciprocal path of said plunger within said housing hollow;

(H) means operative in response to axial movement of said input rod in response to operator actuation of the control device to move said plunger axially within said housing hollow against the resistance of said spring into successive juxtaposition with said series of electrical contacts; and (I) means on said plunger operative to successively coact with each of said series of electrical contacts upon successive movement of said plunger into juxtaposition with said contracts to successively make or break vehicular electrical control circuits respectively controlled by said contacts.

2. A hydraulic master cylinder assembly according to claim 1 wherein:

(J) said means on said plunger includes an electrical contact mounted on said plunger and movable axially with said plunger in response to axial movement of said input rod into selective engagement with axially spaced contacts.

3. A hydraulic master cylinder assembly according to claim 1 wherein:

(J) said operative means includes means on said input rod defining a shoulder facing toward said master cylinder for pushing engagement with said plunger; and (K) said spring operates to urge a surface on said plunger into abutting engagement with said shoulder to define the rest position of said switch.

4. A hydraulic master cylinder assembly according to claim 1, wherein:

(J) the hollow of said housing is positioned in surrounding relation to said central input rod portion; and (K) said plunger is mounted on said input rod central portion for movement therewith.

5. A hydraulic master cylinder assembly according to claim 4 wherein:

(L) said switch housing has a U configuration in transverse cross section so as to enable said housing to be moved transversely from one side of said input rod into surrounding relation with said input rod.

6. A hydraulic master cylinder assembly according to claim 5 wherein:

(M) said plunger has a U configuration matching that of said housing and so as to enable said housing and plunger to be moved transversely as a subassembly from one side of said input rod portion into surrounding relation to said input rod portion.

7. The switch of claim 1 wherein said plunger projects from said housing hollow for engagement at its free end with a stationary portion of said master cylinder.

8. The switch of claim 1 wherein said master cylinder is the master cylinder of a hydraulic clutch control system and one of said circuits is a starter motor relay interlock circuit.

9. The switch of claim 8 wherein another one of said circuits is a cruise control circuit.

10. The switch of claim 1 wherein said housing is mounted on said one end of said master cylinder.

11. A hydraulic master cylinder assembly including:

(A) a cylinder defining an axial bore;

(B) a piston mounted for axial sliding movement in said bore;

(C) a solid, rigid pushrod extending axially into said bore through the rear end of said cylinder, connected at its forward end to said piston, and extending at its rear end rearwardly out of said cylinder; and (D) a switch including a housing mounted on said pushrod rearwardly of said cylinder, at least one electrical contact carried by said housing and adapted to control an electrical control circuit, and actuator means operative in response to axial movement of said pushrod into said cylinder bore to coact with said contact to make or break said circuit.

12. A hydraulic master cylinder assembly according to claim 11 wherein:

(E) said switch includes a plurality of axially spaced contacts carried on said housing and adapted to respectively control a plurality of electrical controlled circuits; and (F) said actuator means is operative in response to axial movement of said pushrod into said cylinder bore to successively coat with said axially spaced contacts to successively make or break said circuits.

13. A hydraulic master cylinder assembly according to claim 11 wherein:

(E) said housing is hollow;

(F) said pushrod extends through the hollow of said housing; and (G) said actuator means comprises a plunger positioned in the hollow of said housing and directly drivingly connected to said pushrod so as to be moved axially within said switch housing in response to axial movement of said pushrod into said cylinder bore.

14. A hydraulic cylinder assembly according to claim 13 wherein:

(A) said plunger is mounted on said pushrod and abuttingly engages a shoulder on said pushrod so as to be directly driven by said pushrod.

15. A hydraulic master cylinder assembly according to claim 14 wherein:

(I) said switch further includes a spring positioned in the hollow of said housing and urging said plunger into abutting engagement with said pushrod shoulder.

16. A hydraulic master cylinder assembly according to claim 15 wherein:

(J) a plurality of axially spaced contacts are mounted in the hollow of said housing in confronting relation to said pushrod;

(K) each contact controls an electrical control circuit; and (L) said plunger successively coacts with each of said contacts in response to axial movement of said pushrod into said cylinder bore to successively make or break said circuits.

17. A hydraulic master cylinder assembly according to claim 16 wherein:

(M) said plunger includes an electrical contact respectively and successively coacting with said axially spaced contacts as said pushrod is moved axially into said cylinder bore.

18. A hydraulic master cylinder assembly according to claim 11 wherein:

(E) said switch housing has a U configuration in transverse cross section so as to allow said switch to be mounted onto said pushrod with a transverse movement relative to said pushrod.

19. A hydraulic master cylinder assembly according to claim 18 wherein:

(F) said housing is hollow; and (G) said actuator means comprises a U-shaped plunger positioned within the hollow of said housing with its opening aligned with the opening of said housing to allow said housing and said plunger to be moved transversely onto said pushrod to mount said switch on said pushrod.

* * * * *